3,194,808
PREPARATION OF 1-(AROMATIC-ALKYL)-2,4-DIOXOHEXAHYDROPYRIMIDINES
Alexander R. Surrey, Albany, and George Y. Lesher, Schodack Township, Rensselaer County, N.Y., assignors to Sterling Drug Inc., New York, N.Y., a corporation of Delaware
No Drawing. Original application Mar. 12, 1958, Ser. No. 720,810, now Patent No. 3,124,580, dated Mar. 10, 1964. Divided and this application Dec. 12, 1962, Ser. No. 255,418
4 Claims. (Cl. 260—260)

The present application is a division of our application Serial No. 720,810, now U.S. Patent 3,124,580, issued March 10, 1954.

This invention relates to compositions of matter of the class of dioxohexahydropyrimidines and to a process for their preparation.

The invention here resides in the concept of compositions of matter having the molecular structure known as 2,4-dioxohexahydropyrimidines and which are substituted in the 1-position by an aromatic-alkyl group and in which the 5-position ring atom is preferably unsubstituted but can be monosubstituted by a low molecular group.

Among the compounds of our invention are those represented by the structural Formula I

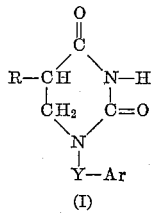

(I)

where R is H, a lower-alkyl radical or a halo radical, Ar is an aromatic radical including phenyl, naphthyl, biphenylyl, furyl, pyridyl and thienyl radicals, and Y is a lower-alkylene radical which can be substituted further by a second aromatic radical Ar. These compounds have valuable pharmacodynamic properties as central nervous system depressants, in particular, anticonvulsant activity. In addition, these compounds have the advantageous property of having relatively low toxicity.

R when lower-alkyl can have from one to six carbon atoms and is illustrated by methyl, ethyl, n-propyl, isopropyl, n-butyl, isobutyl, n-amyl, n-hexyl, and the like. Preferred embodiments are those where R is methyl or ethyl.

The lower-alkylene radical designated above as Y can have from one to four carbon atoms and can be substituted further by a second aromatic radical designated above as Ar, and is illustrated by

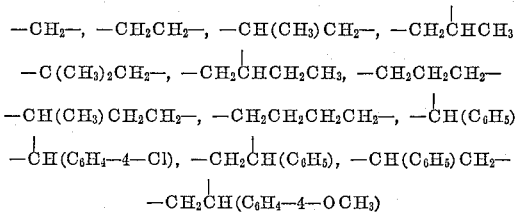

and the like.

Preferred embodiments of our invention are compounds of the above Formula I where Y is —CH$_2$—, R is H and where the aromatic radical designated as Ar is a monocarbocyclic aryl radical having six ring-carbon atoms, that is, an aryl radical of the benzene series. These preferred embodiments include compounds where Ar is the unsubstituted phenyl radical and phenyl radicals substituted by substituents including halo, lower-alkoxy, lower-alkyl, lower-alkylmercapto, trifluoromethyl, nitro, amino, (lower-acyl)amino, (lower-alkyl)amino, and the like. The substituted-phenyl radicals have preferably from one to three substituents including those given above; and, furthermore, these substituents can be in any of the available positions of the phenyl nucleus, and where more than one substituent, they can be the same or different and they can be in any of the various position combinations relative to each other. Particularly preferred embodiments are compounds of Formula I where Y is —CH$_2$— and where Ar is a halogenated-phenyl radical having from one to two halo substituents, e.g., 4-chlorophenyl, 4-bromophenyl, 2-chlorophenyl, 2,4-dichlorophenyl, 3,4-dichlorophenyl, and the like.

The compounds of our invention having Formula I where R is H or lower-alkyl can be prepared by various procedures. One procedure is carried out by reacting an N-(2-carbamylalkyl)-aromatic-alkylamine having the formula Ar—Y—NHCH$_2$CH(R)CONH$_2$ or an N-[2-(lower-carbalkoxy)alkyl]-aromatic-alkylamine having the formula Ar—Y—NHCH$_2$CH(R)COO-(lower-alkyl), where Ar and Y have the meanings given above and R is H or a lower-alkyl radical, with a water-soluble inorganic cyanate or urea. The reaction with a water-soluble inorganic cyanate, e.g., potassium cyanate, sodium cyanate, ammonium cyanate, is run preferably by warming the reactants at about 50° C. to 100° C. in an aqueous medium. The intermediate esters and amides can be used in their free base form or in the form of their acid-addition salts, e.g., hydrochlorides. The reaction with urea is run preferably by heating the reactants in the absence of a solvent at about 200° C. to 250° C.

The intermediate N-(2-carbamylalkyl)-aromatic-alkylamines are disclosed and claimed in a copending application Serial Number 537,552, filed September 29, 1955, now U.S. Patent 2,886,594 issued May 12, 1959.

An alternative procedure for the preparation of the compounds having Formula I where R is H or lower-alkyl comprises reacting a compound having the Formula II

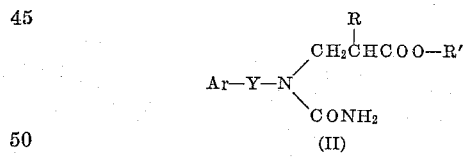

(II)

where Ar and Y have the meanings designated hereinafter, and R and R' are each H or lower-alkyl radicals, with an acidic agent. This reaction was run preferably by reacting the ester or acid having Formula II with a strong mineral acid, e.g., HCl, HBr, H$_2$SO$_4$, in an aqueous or alcoholic medium, i.e., water, ethanol, propanol, or mixtures thereof. The reaction is conveniently carried out on a steam bath at a temperature of about 50–100° C. although the reaction will take place at room temperature if the reactants are mixed and allowed to stand for a longer period; in some instances where R' was H, the reaction took place immediately at room temperature, with the product precipitating from the reaction solution. Alternatively, when R' is H, the reaction can be carried out by heating an N-carbamyl-N-(2-carboxyalkyl)-aromatic-alkylamine with an alkanoic anhydride, e.g., acetic anhydride, preferably by warming a mixture of the amine and the anhydride on a steam bath.

Another procedure for the preparation of our compounds having FORMULA I where R is H or lower-alkyl comprises the steps of: reacting an N-[2-(lower-carbalkoxy)alkyl]-aromatic-alkylamine having the formula Ar—Y—NHCH₂CH(R)COO-(lower-alkyl)

where Ar and Y have the meanings designated hereinabove and R is H or lower-alkyl, with a carbamylating agent; and reacting the resulting N-carbamyl-N-[2-(lower-carbalkoxy)alkyl]-aromatic-alkylamine with an acidic agent. The second step was run as described in the immediately preceding paragraph. As carbamylating agents in the first step, we found useful nitrourea or a mixture of a water-soluble inorganic cyanate, e.g., potassium cyanate, and at least a molar equivalent of acetic acid or an acid of comparable acidic strength; in practicing our invention we preferably used these carbamylating agents. The reaction using the cyanate and acetic acid as the carbamylating agent was run preferably by warming the reactants in an aqueous, alkanol or water-alkanol medium and then allowing the reaction mixture to stand at room temperature for about four to six hours. When using nitrourea as the carbamylating agent, the reaction was run preferably by warming the reactants in an alkanol, e.g., ethanol, for about four to six hours.

Another procedure for the preparation of the compounds of Formula I where R is H or lower-alkyl comprises reacting an N-(2-carbamylalkyl)-N-1(aromatic-alkyl)-trichloroacetamide having the Formula III.

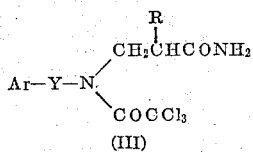

(III)

where Ar and Y have the meanings designated hereinabove and R is H or lower-alkyl, with an alkaline agent. The reaction was run with cooling or at room temperature, using preferably a solvent mixture of water and a non-polar solvent, e.g., ethylene dichloride, and with stirring. The alkaline agent used was preferably aqueous alkali hydroxide, e.g., NaOH; the preferred amount being less than a molar equivalent. The preferred reaction time was about two to four hours although, in some instances, twenty-four to forty-eight hours were taken. Use of larger quantities of alkaline agent, i.e., from about two to four molar equivalents, resulted in ring-opening of the 1-(aromatic-alkyl)-2,4-dioxohexahydropyrimidine to form an N-carbamyl-N-(2-carboxyalkyl)-aromatic-alkylamine (Formula II where R' is H) as discussed below. This reaction is reversed, i.e., ring closure is effected to re-form the 1-(aromatic-alkyl)-2,4-dioxohexahydropyrimidine by treating the N-carbamyl-N-(2-carboxyalkyl)-aromatic-alkylamine with an acidic agent, e.g., HCl, acetic anhydride, as shown above.

Alternatively, the preparation of the compounds of Formula I where R is H or lower-alkyl from an N-(aromatic-alkyl)-N-(2-carbamylalkyl)trichloroacetamide can be done directly in a two-step process by reacting the intermediate N-(2-carbamylalkyl)-aromatic-alkylamine of the formula AR—Y—NHCH₂CH(R)CONH₂ with trichloroacetyl chloride in the presence of preferably from more than one to less than two molar equivalents of an alkaline agent. The reagent thus proceeds first to form the N-(aromatic-alkyl)-N-(2-carbamylalkyl)trichloroacetamide which is then converted directly without isolation into the 1-(aromatic-alkyl)-2,4-dioxohexahydropyrimidine by reaction with the alkaline agent as discussed above.

The compounds of our invention having Formula I where R is halo are prepared by reacting an 1-(aromatic-alkyl)-2,4-dioxohexahydropyrimidine having Formula I where R is H with a halogenating agent. In the preparation of the compounds where R is a bromo radical, this reaction was run preferably using bromine as the brominating agent. In practicing the invention we ran the reaction in a sealed tube, using chloroform as a solvent and a reaction temperature of about 100° C. Other 5-halo compounds can be prepared using the appropriate halogenating agent, for instance, in the preparation of 5-chloro compounds a suitable chlorinating agent, e.g., sulfuryl chloride, can be used.

Another aspect of the invention resides in the above-described intermediate compounds having the structural Formula II

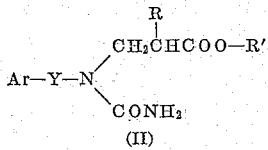

(II)

where R and R' are each H or lower-alkyl radicals, Ar is a member selected from the group consisting of phenyl, naphthyl, biphenylyl, furyl, pyridyl and thienyl radicals, and Y is a lower-alkylene radical which can be substituted further by a second aromatic radical Ar. These intermediate compounds are prepared by: (a) reacting an N-[2-(lower-carbalkoxy)alkyl]aromatic-alkylamine having the formula Ar—Y—NHCH₂CH(R)COO-(lower-alkyl)

with a carbamylating agent to yield the ester where R' is lower-alkyl; and (b) hydrolyzing said ester where R' is lower-alkyl with an alkaline agent to yield the acid where R' is H. The first step, i.e., the carbamylating step is discussed hereinabove. The hydrolysis step was carried out preferably in aqueous medium at room temperature using an alkali hydroxide, e.g., NaOH, as the alkaline agent.

Alternatively, the intermediate N-carbamyl-N-(2-carboxyalkyl)-aromatic-alkylamines having the structural Formula II where R' is H are prepared by reacting an N-(aromatic-alkyl)-N-(2-carbamylalkyl)trichloroacetamide having structural Formula III with an excess of an alkaline agent. As discussed above, this reaction is run preferably using two to four molar equivalents of an alkaline agent, e.g., NaOH, in a solvent mixture of water and a non-polar solvent, e.g., ethylene dichloride. The reaction takes place in two steps, first forming an 1-aralkyl-2,4-dioxohexahydropyrimidine (Formula I) and then opening of the pyrimidine ring to form the N-carbamyl-N-(2-carboxyalkyl)-aromatic-alkylamine.

The chemical structures of our 1-(aromatic-alkyl)-2,4-dioxohexahydropyrimidines and intermediate N-carbamyl-N-(2-carboxyalkyl)-aromatic-alkylamines and intermediate N-carbamyl-N-[2-(lower-carbalkoxy)-alkyl]-aromatic-alkylamines are established by their mode of syntheses and corroborated by the correspondence of calculated and found values for the elementary analyses for representative examples.

The following examples will further illustrate specific embodiments of the invention without, however, limiting it thereto.

EXAMPLE 1

(A) *N-(2-carbamylalkyl)-aromatic-alkylamines*

These intermediate compounds having the formula Ar—Y—NHCH₂CH(R)CONH₂ are generally known and are prepared by reacting an aromatic-alkylamine with a 2-alkenamide, as illustrated by the following synthesis of N-(2-carbamylethyl)-2-chlorobenzylamine:

A mixture containing 22.2 g. of 2-chlorobenzylamine and 18.0 of acrylamide was warmed until dissolution was complete; and the resulting solution was allowed to stand at room temperature for ten days. The solution was then dissolved in 800 cc. of acetone, filtered, and 40 cc. of 6 N ethanolic hydrogen chloride added. The resulting precipitate was collected, washed with acetone and dried to yield 34 g. (68% yield) of N-(2-carbamylethyl)-2-chlorobenzylamine as its hydrochloride monohydrate. For analysis, a small sample was recrystallized twice from isopropyl alcohol and dried at 90° C., M.P. 146–150° C. *Anal.*—Calcd. for $C_{10}H_{13}ClN_2O \cdot HCl \cdot H_2O$ Cl, 13.30. Found: Cl, 13.10.

Other new N-(2-carbamylalkyl)-aromatic-alkylamines that were prepared and characterized following the foregoing procedure are the following: N-(2-carbamylethyl)-4-dimethylaminobenzylamine hydrochloride, M.P. 195–200° C. (base, M.P. 128–132° C.). [*Anal.*—Calcd. for $C_{12}H_{19}N_3O \cdot HCl$: Cl, 14.55. Found: Cl, 14.22]; N-(2-carbamylethyl) - 3,4 - dichlorobenzylamine hydrochloride, M.P. 241–242° C. [*Anal.*—Calcd. for $C_{10}H_{12}Cl_2N_2O \cdot HCl$ Cl, 12.50. Found: Cl, 12.33]; N-(2-carbamylethyl)-α-methylbenzylamine hydrochloride, M.P. 162.5–164° C. [*Anal.*—Calcd. for $C_{11}H_{16}N_2O \cdot HCl$: Cl, 15.50. Found: Cl, 15.48]; N - (2 - carbamylethyl)-2-phenylethylamine, M.P. 181.3–182.7° C. (corr.). [*Anal.*—Calcd. for $C_{11}H_{16}N_2O$: Cl, 15.50; N, 12.25. Found: Cl. 15.28; N, 12.32]; and N-(2-carbamylethyl) - 2 - (3,4 - dimethoxyphenyl)ethylamine, M.P. 181–183° C. [*Anal.*—Calcd. for $C_{13}H_{20}N_2O_3$: Cl. 12.28. Found: Cl, 11.70.]

(B) *1-(aromatic-alkyl)-2,4-dioxohexahydropyrimidines*

The preparation of these compounds by reacting an N - (aromatic - alkyl) - N - (2 - carbamylalkyl)trichloroacetamide with an alkaline agent is illustrated in Example 2B. Alternatively, this preparation can be done directly by reacting an N-(2-carbamylalkyl)-aromatic-alkylamine (see Example 1A for preparation) with trichloroacetyl chloride in the presence of an alkaline agent; the reaction thus proceeds first to form the N-(aromatic-alkyl) - N - (2 - carbamylalkyl)trichloroacetamide which is then converted directly without isolation into the 1 - (aromatic - alkyl) - 2,4 - dioxohexahydropyrimidine by reaction with the alkaline agent. This latter procedure is illustrated by the following preparation of 1-(2-chlorobenzyl)-2,4-dioxohexahydropyrimidine:

Thirty-four g. of N-(2-carbamylethyl)-2-chlorobenzylamine hydrochloride was mixed with 310 cc. of a 1 N aqueous solution of sodium hydroxide and 250 cc. of ethylene dichloride; and to this mixture was added with stirring and cooling a solution of 27 g. of trichloroacetyl chloride in 50 cc. of ethylene dichloride. An additional 100 cc. of a 1 N aqueous solution of sodium hydroxide was added and the resulting mixture was stirred at room temperature for about sixteen hours. The aqueous layer was separated, washed with ethylene dichloride, made acidic with concentrated hydrochloric acid and extracted with chloroform. The chloroform solution was dried and evaporated to dryness, yielding a solid which was recrystallized once from isopropyl alcohol and once from isopropyl alcohol-ethanol to yield 4 g. (12.5% yield) of the product, 1 - (2-chlorobenzyl)-2,4-dioxohexahydropyrimidine, M.P. 167.2–168.8° C. (corr.).

*Anal.*—Calcd. for $C_{11}H_{11}ClN_2O_2$: Cl, 14.85; N, 11.74. Found: Cl, 15.02; N, 11.56.

When administered interperitoneally as a suspension in an aqueous 1% gum tragacanth solution, the median effective dose ($PD_{50}$) of 1-(2-chlorobenzyl)-2,4-dioxohexahydropyrimidine necessary ot prevent death of mice which were treated with lethal doses ($LD_{100}$) of strychnine hydrochloride given intravenously sixty minutes after administraiton of the dioxohexahydropyrimidine was found to be 73±18 mg. per kg.; this is an illustration of central nervous system depressant activity of this compound. The intraperitoneal median effective dose ($PD_{50}$) of 1-(2-chlorobenzyl)-2,4-dioxohexahydropyrimidine necessary to protect mice from the hind limb extensor component of maximal electroshock seizures was found to be 33±3.7 mg. per kg. using essentially the method of Swinyard et al.; this procedure demonstrates anticonvulsant properties of this compound. 1-(2-chlorobenzyl)-2,4-dioxohexahydropyrimidine was found to have acute intraperitoneal toxicity ($LD_{50}$) in mice of 1950±312 mg. per kg.

Other 1 - (aromatic-alkyl) - 2,4-dioxohexahydropyrimidines that can be prepared according to the foregoing procedure used for the preparation of 1-(2-chlorobenzyl)-2,4-dioxohexahydropyrimidine using the appropriate N-(2-carbamylalkyl)-aralkylamine are:

1-(naphthylmethyl)-1,4-dioxohexahydropyrimidine using N-(2-carbamylethyl)-1-naphthylmethylamine;
1-(1-biphenylylmethyl)-2,4-dioxohexahydropyrimidine using N-(2-carbamylethyl)-1-biphenylylmethylamine;
1-(4-n-hexylbenzyl-2,4-dioxohexahydropyrimidine using N-(2-carbamylethyl)-4-n-hexylbenzylamine;
1-(2,4-diiodobenzyl)-2,4-dioxohexahydropyrimidine using N-(2-carbamylethyl)-2,4-diiodobenzylamine;
1-[2-(4-nitrophenyl)ethyl]-2,4-dioxohexahydropyrimidine using N-(2-carbamylethyl)-2-(4-nitrophenyl) ethylamine;
1-[1-(3,4,5-triethoxyphenyl)ethyl]-5-methyl-2,4-dioxohexahydropyrimidine using N-(2-carbamylpropyl)-1-(3,4,5-triethoxyphenyl)ethylamine;
1-[4-(2,4-dichlorophenyl)butyl]-5-methyl-2,4-dioxohexahydropyrimidine using N-(2-carbamylpropyl)-4-(2,4-dichlorophenyl)butylamine;
1-(4-di-n-butylaminobenzyl)-5-ethyl-2,4-dioxohexahydropyrimidine using N-(2-carbamylbutyl)-4-di-n-butylaminobenzylamine;
1-(4-n-hexoxybenzyl)-2,4-dioxohexahydropyrimidine using N-(2-carbamylethyl)-4-n-hexoxybenzylamine;
1-(4-n-butylmercaptobenzyl)-2,4-dioxohexahydropyrimidine using N-(2-carbamylethyl)-4-n-butylmercaptobenzylamine;
1-(4-n-butylsulfonylbenzyl)-2,4-dioxohexahydropyrimidine using N-(2-carbamylethyl)-4-n-butylsulfonylbenzylamine;
1-(4-nitrobenzyl)-2,4-dioxohexahydropyrimidine using N-(2-carbamylethyl)-4-nitrobenzylamine;
1-(2-furylmethyl)-2,4-dioxohexahydropyrimidine using N-(2-carbamylethyl)-2-furylmethylamine;
1-(2-thienylmethyl)-2,4-dioxohexahydropyrimidine using N-(2-carbamylethyl)-2-thienylmethylamine;
1-(2-pyridylmethyl)-2,4-dioxohexahydropyrimidine using N-(2-carbamylethyl)-2-pyridylmethylamine;
1-(3-pyridylmethyl)-2,4-dioxohexahydropyrimidine using N-(2-carbamylethyl)-3-pyridylmethylamine;
1-(5-chloro-2-pyridyl)-4-methyl-2,4-dioxohexahydropyrimidine using N-(2-carbamylpropyl)-4-chloro-2-pyridylmethylamine; and the like.

EXAMPLE 2

(A) *N-(aromatic-alkyl)-N-(2-carbamylalkyl)trichloroacetamides*

These intermediate compounds are generally known and are prepared by reacting an N-(2-carbamylalkyl)-aromatic-alkylamine with a trichloroacetylating agent, preferably with trichloroacetyl chloride. Previously unpublished and uncharacterized compounds prepared for carrying out our invention are given as follows: N-(2,4-dichlorobenzyl)-N-(2-carbamylethyl)trichloroacetamide, M.P. 122.5–134° C. [used in next step without further purification]; N - (3,4-dimethoxybenzyl)-N-(2-carbamylethyl) trichloroacetamide, M.P. 132.0–133.6° C. (corr.) [*Anal.*—Calcd. for $C_{14}H_{17}Cl_3N_2O$: Cl, 27.72; N, 7.30. Found: Cl, 27.33; N, 7.20]; N-(3,4-methylenedioxybenzyl)-N-(2-carbamylethyl)trichloroacetamide, M.P. 130.0–133.0° C. (corr.) [*Anal.*—Calcd. for $C_{13}H_{13}Cl_3N_2O_4$: Cl, 28.93; N, 7.62. Found: Cl, 28.66; N, 7.54]; and N-(α-methylbenzyl) - N-(2-carbamylethyl)trichloroacetamide, M.P. 138–142° C. [*Anal.*—Calcd. for $C_{13}H_{15}Cl_3N_2O_2$: Cl, 31.58. Found: Cl, 31.46.]

(B) *1-(aromatic-alkyl)-2,4-dioxohexahydropyrimidines*

The preparation of these compounds by reacting an N-(aromatic-alkyl) - N-(2-carbamylalkyl)trichloroacetamide with an alkaline agent is illustrated by the following synthesis of 1-(4-chlorobenzyl)-2,4-dioxohexahydropyrimidine:

A mixture containing 12 g. of N-(4-chlorobenzyl)-N-(2-carbamylethyl)trichloroacetamide, 70 cc. of 0.5 N aqueous sodium hydroxide solution and 70 cc. of ethylene dichloride was stirred at room temperature for about sixteen hours. Complete dissolution resulted after about three hours of stirring. The water layer was separated, made acidic with an excess of concentrated hydrochloric acid, and partially extracted with chloroform. The oily product was not very soluble in chloroform and solidified during the attempted chloroform extraction. The solid was collected and combined with the solid obtained by evaporating the chloroform extract to dryness. The solid was recrystallized from isopropyl alcohol to yield 5.5 g. of the product, 1-(4-chlorobenzyl)-2,4-dioxohexahydropyrimidine, M.P. 174.8–176.0° C. (corr.).

*Anal.*—Calcd. for $C_{11}H_{11}ClN_2O_2$: Cl, 14.85; N, 11.74. Found: Cl, 14.91; N, 11.49.

When administered intraperitoneally as a suspension in an aqueous 1% gum tragacanth solution, the median effective dose ($PD_{50}$) of 1-(4-chlorobenzyl)-2,4-dioxohexahydropyrimidine necessary to prevent death of mice which were treated with lethal doses ($LD_{100}$) of strychnine hydrochloride given intravenously sixty minutes after administration of the dioxohexahydropyrimidine was found to be $34\pm4.8$ mg. per kg.; this is an illustration of central nervous system depressant activity of this compound. The intraperitoneal median effective dose ($DP_{50}$) of 1-(4-chlorobenzyl)-2,4-dioxohexahydropyrimidine necessary to protect mice from the hind limb extensor component of maximal electroshock seizures was found to be $64\pm5.8$ mg. per kg. using essentially the method of Swinyard et al.; this procedure demonstrates anticonvulsant properties of this compound. 1-(4-chlorobenzyl)-2,4-dioxohexahydropyrimidine was found to have an acute intraperitoneal toxicity ($LD_{50}$) in mice of $680\pm74$ mg. per kg.

Other 1 - (aromatic-alkyl)-2,4-dioxohexahydropyrimidines that can be prepared following the procedure described above for the preparation of 1-(4-chlorobenzyl)-2,4-dioxohexahydropyrimidine using the appropriate N-aralkyl-N-(2-carbamylalkyl)tricholoracetamide are:

1-(4-n-butoxybenzyl)2,4-dioxohexahydropyrimidine using N-(4-n-butoxybenzyl)-N-(2-carbamylethyl)trichloroacetamide;

1-benzyl-2,4-dioxohexahydropyrimidine using N-benzyl-N-(2-carbamylethyl)trichloroacetamide;

1-(2-phenylethyl)-2,4-dioxohexahydropyrimidine using n-(2-phenylethyl)-N-(2-carbahylethyl)trichloroacetamide;

1-(4-isopropylbenzyl)-2,4-dioxohexahydropyrimidine using N-(4-isopropylbenzyl)-N-(2-carbamylethyl)trichloroacetamide;

1-(3,4-dibromobenzyl)-5-methyl-2,4-dioxohexahydropyrimidine using N-(3,4-dibromobenzyl)-N-(2-carbamylpropyl)tribromoacetamide;

1-(4-isobutylbenzyl)-5-ethyl-2,4-dioxohexahydropyrimidine using N-(4-isobutylbenzyl)-N-(carbamylbutyl)trichloroacetamide;

1-(3,4,5-triiodobenzyl)-2,4-dioxohexahydropyrimidine using N-(3,4,5-triiodobenzyl)-N-(carbamylethyl)trichloroacetamide;

1-[2-(2,4-dichlorophenyl)-ethyl]-2,4-dioxohexahydropyrimidine using N-[2-(2,4-dichlorophenyl)ethyl]-N-(2-carbamylethyl)trichloroacetamide; and the like.

EXAMPLE 3

*1-(aromatic-alkyl)-2,4-dioxohexahydropyrimidines*

The preparation of these compounds by reacting an N-(2-carbamylalkyl)aromatic-alkylamine with a water-soluble inorganic cyanate is illustrated by the following preparation of 1-(α-methylbenzyl)-2,4-dioxohexahydropyrimidine:

A mixture containing 9.5 g. of N-(2-carbamylethyl)-α-methylbenzylamine hydrochloride, 4.1 g. of potassium cyanate and 50 cc. of water was warmed on a steam bath for about three hours. An equal volume of water was added and the resulting mixture cooled. The solid that was collected and recrystallized twice from isopropyl alcohol to yield 1.5 g. (17% yield) of product, 1-(α-methylbenzyl) - 2,4 - dioxohexahydropyrimidine, M.P. 115.4–117.4° C. (corr.).

*Anal.*—Calcd. for $C_{12}H_{14}N_2O_2$: C, 66.10; H, 6.48; N, 12.72. Found: C, 66.31; H, 6.23; N, 12.97.

Alternatively, the above reaction can be carried out using N-(2-carbamylethyl)-α-methylbenzylamine in free base form.

When administered intraperitoneally as a suspension in an aqueous 1% gum tragacanth solution, the median effective dose ($PD_{50}$) of 1-(α-methylbenzyl)-2,4-dioxohexahydropyrimidine necessary to prevent death of mice which were treated with lethal doses ($LD_{100}$) of strychnine hydrochloride given intravenously sixty minutes after administration of the dioxohexahydropyrimidine was found to be $235\pm33$ mg. per kg. The intraperitoneal median effective dose ($PD_{50}$) of 1-(α-methylbenzyl)-2,4-dioxohexahydropyrimidine necessary to protect mice from the hind limb extensor component of maximal electroshock seizures was found to be $108\pm19.5$ mg. per kg. using essentially the method of Swinyard et al. 1-(α-methylbenzyl)-2,4-dioxohexahydropyrimidine was found to have an acute intraperitoneal toxicity ($ALD_{50}$) in mice of 435 mg. per kg.

Following the procedure given above for the preparation of 1-(α-methylbenzyl)-2,4-dioxohexahydropyrimidine but using N-(2-carbamylethyl)-4-chlorobenzylamine, N-(2 - carbamylethyl) - 1-naphthylmethylamine, N-(2-carbamylethyl)-2-pyridylmethylamine or N-(2-carbamylethyl)-2,4-dichlorobenzylamine in place of N-(2-carbamylethyl)-α-methylbenzylamine, there is obtained the following respective compounds: 1-(4-chlorobenzyl)-2,4-dioxohexahydropyrimidine, 1 - (1-naphthylmethyl)-2,4-dioxohexahydropyrimidine, 1-(2-pyridylmethyl)-2,4-dioxohexahydropyrimidine or 1-(2,4-dichlorobenzyl)-2,4-dioxohexahydropyrimidine.

EXAMPLE 4

(A) *N-(2-carbalkoxyalkyl)-aromatic-alkylamines*

These intermediate compounds having the formula Ar—Y—NHCH$_2$CH(R)COO-(lower-alkyl) are generally known and are prepared by reacting an aromatic-alkylamine with a lower-alkyl 2-alkenoate. Previously unpublished and uncharacterized compounds prepared for carrying out our invention are given as follows: N-(2-carbomethoxyethyl)-4-methylbenzylamine, B.P. 130–135° C. at 0.5 mm., $n_D^{25}=1.5077$ [*Anal.*—Calcd. for $C_{12}H_7NO_2$: N, 6.76. Found: N, 6.63]; N-(2-carbomethoxyethyl)-4-acetylaminobenzylamine, M.P. 91–92° C. [*Anal.*—Calcd. for $C_{13}H_{18}N_2O_3$: N, 8.33. Found: N, 8.33]; N-(2-carbomethoxyethyl)-4-acetylaminobenzylamine hydrochloride, M.P. 237–239° C. [*Anal.*—Calcd. for $C_{13}H_{18}N_2O_3 \cdot HCl$: Cl, 12.36. Found: Cl, 12.18]; N-(2-carbomethoxyethyl)-2-n-propoxybenzylamine [used directly without distillation]; N - (2 - carbomethoxyethyl)-3,4-dimethoxybenzylamine, B.P. 154–160° C. at 0.3 mm., $n_D^{25}=1.5213$ [*Anal.*—Calcd. for $C_{13}H_{19}NO_4$: N, 5.53. Found: N, 5.22]; N - (2 - carbomethoxyethyl)-2-chlorobenzylamine, B.P. 135–143° C. at 2.0 mm., $n_D^{25}=1.5260$ [*Anal.*—Calcd. for $C_{11}H_{14}ClNO_2$: Cl, 15.56. Found: Cl, 15.56]; N-(2-carbomethoxyethyl)-3-chlorobenzylamine [used directly without distillation]; N-(2-carbomethoxyethyl)-4-chlorobenzylamine, B.P. 103–111° C. at 0.3 mm., $n_D^{25}$=1.5183 [Anal.—Calcd. for $C_{11}H_{14}ClNO_2$: N, 6.15. Found: N, 5.92]; N-(2-carbomethoxyethyl)-2,4-dichlorobenzylamine, B.P. 135–139° C. at 0.5 mm., $n_D^{25}$=1.5350 [Anal.—Calcd. for $C_{11}H_{13}Cl_2NO_3$: N, 5.34. Found: N, 5.25]; N - (2 - carbomethoxyethyl) - 2,4-dichlorobenzylamine hydrochloride, M.P. 123–136° C. [Anal.—Calcd. for $C_{11}H_{13}Cl_2NO_3 \cdot HCl$: Cl, 11.87. Found: Cl, 11.52]; N - (2-carbomethoxyethyl)-3,4-dichlorobenzylamine, B.P. 115–124° C. at 0.04 mm., $n_D^{25}$=1.5335 [Anal.—Calcd. for $C_{11}H_{13}Cl_2NO_2$: N, 5.34. Found: N, 5.29]; N-(2-carbomethoxyethyl) - 2,3,4,5,6 - pentachlorobenzylamine, M.P. 78–81° C. [Anal.—Calcd. for $C_{11}H_{10}Cl_5NO_2$: Cl, 48.60. Found: Cl, 94.36]; N-(2-carbomethoxyethyl)-1-naphthylmethylamine [used directly without distillation]; N-(2-carbomethoxyethyl) - 2-furylmethylamine, B.P. 124–129° C. at 6.0 mm., $n_D^{25}$=1.4772 [Anal.—Calcd for $C_9H_{13}NO_2$: N, 7.65. Found: N, 7.52]; N-(2-carbomethoxyethyl)-2-(4-chlorophenyl)ethylamine, B.P. 119–130° C. at 0.3 mm., $n_D^{25}$=1.5190 [Anal.—Calcd. for $C_{12}H_{16}ClNO_2$: N, 5.80. Found: N, 5.70]; N-(2-carbomethoxyethyl)benzhydrylamine hydrochloride, M.P. 237–238° C. with decomposition [Anal.—Calcd. for $C_{17}H_{19}NO_2 \cdot HCl$: Cl, 11.60. Found: Cl, 11.52]; N-(2-carbomethoxyethyl)-2-pyridylmethylamine, B.P. 125–130° C. at 2.0 mm., $n_D^{25}$=1.5081 [Anal.—Calcd. for $C_{10}H_{14}N_2O_2$: N, 14.40. Found: N, 13.89]; and N-(2-carbomethoxyethyl)-α-(4-chlorophenyl)benzylamine, B.P. 136–145° C. at 0.005 mm., $n_D^{25}$=1.5636 [Anal.—Calcd. for $C_{17}H_{18}ClNO_2$: N, 4.60. Found: N, 4.94].

(B) *1-(aromatic-alkyl)-2,4-dioxohexahydropyrimidines*

The preparation of these compounds by reacting an N-(2-carbalkoxyalkyl)-aromatic-alkylamine with a water-soluble inorganic cyanate is illustrated by the following preparation of 1 - (4-acetylaminobenzyl)-2,4-dioxohexahydropyrimidine:

A mixture containing 11 g. of N-(2-carbomethoxyethyl)-4-acetylaminobenzylamine hydrochloride, 3.4 g. of potassium cyanate, 11 g. of sodium acetate and 80 g. of water was heated on a steam bath for six hours in an open container; at the end of this time the reaction solution had evaporated to a volume of about 20 cc. The solution was allowed to cool and stand overnight at room temperature. The solid that separated was collected and recrystallized from anhydrous ethanol to yield 4 g. (40% yield) of the product, 1-(4-acetylaminobenzyl)-2,4-dioxohexahydropyrimidine, M.P. 211.8–215.9° C. (corr.).

Anal.—Calcd. for $C_{13}H_{15}N_3O_3$: C, 59.70; H, 5.80; N, 16.10. Found: C, 59.56; H, 6.10; N, 16.02.

Alternatively, the foregoing reaction can be carried out using N - (2 - carbomethoxyethyl)-4-acetylaminobenzylamine in free base form.

EXAMPLE 5

*1-benzyl-2,4-dioxohexahydropyrimidine*

This compound was prepared following the procedure described above in Example 1B using 21.4 g. of N-(2-carbamylethyl)benzylamine hydrochloride, 20.0 g. of trichloroacetyl chloride, 310 cc. of 1 N sodium hydroxide solution and 200 cc. of ethylene dichloride. There was thus obtained 17 g. (83% yield) of the product, 1-benzyl-2,4-dioxohexahydropyrimidine, M.P. 128.0–129.8° C. (corr.).

Anal.—Calcd. for $C_{11}H_{12}N_2O_2$: C, 64.70; H, 5.93; N, 13.72. Found: C, 65.00; H, 5.99; N, 13.63.

When administered intraperitoneally as a suspension in an aqueous 1% gum tragacanth solution, the median effective dose (PD$_{50}$) of 1-benzyl-2,4-dioxohexahydropyrimidine necessary to prevent death of mice which were treated with lethal doses (LD$_{100}$) of strychnine hydrochloride given intravenously sixty minutes after administration of the dioxohexahydropyrimidine was found to be 57±19.4 mg. per kg. The intraperitoneal median effective dose (PD$_{50}$) of 1-benzyl-2,4-dioxohexahydropyrimidine necessary to protect mice from the hind limb extensor component of maximal electroshock seizures was found to be 104±15.8 mg. per kg. using essentially the method of Swinyard et al. 1-benzyl-2,4-dioxohexahydropyrimidine was found to have an acute intraperitoneal toxicity (LD$_{50}$) in mice of 840±118 mg. per kg.

EXAMPLE 6

(A) *N-carbamyl-N-(2-carboxyalkyl)-aromatic-alkylamines*

These intermediate compounds having the formula Ar—Y—N(CONH$_2$)CH$_2$CH(R)COOH are novel and are prepared from the N-(aromatic-alkyl)-N-(2-carbamylalkyl)trichloroacetamides of Example 2A by treatment with an excess of an alkaline agent, as illustrated by the following preparation of N-carbamyl-N-(2-carboxyethyl)-benzylamine [which also can be named 1-benzyl-1-(2-carboxyethyl)urea]:

A mixture containing 15 g. of N-benzyl-N-(2-carbamylethyl)trichloroacetamide, 50 cc. of a 1 N sodium hydroxide solution and 100 cc. of ethylene dichloride was stirred at room temperature for eight hours. The water layer was separated; the ethylene dichloride layer was washed with water; the water washings were combined with the water layer; and the combined aqueous solution was treated with 6 N aqueous hydrochloric acid solution. The solid that separated was dried about sixteen hours at 90° C., yielding 9 g. (88% yield) of the product, N-carbamyl-N-(2-carboxyethyl)benzylamine, M.P. 123.0–125.2° C. (corr.).

Anal.—Calcd. for $C_{11}H_{14}N_2O_3$: N, 12.60; O, 21.60. Found: N, 12.47; O, 21.20.

Following the above procedure used for the preparation of

N-carbamyl-N-(2-carboxyethyl)benzylamine and using
  N-(4-chlorobenzyl)-N-(2-carbamylethyl)trichloroacetamide,
N-(3,4-dichlorobenzyl)-N-(2-carbamylethyl)trichloroacetamide and N-(2-phenylethyl)-N-(2-carbamylethyl)-trichloroacetamide in place of N-benzyl-N-(2-carbamylethyl)trichloroacetamide,
there were obtained N-carbamyl-N-(2-carboxyethyl)-4-chlorobenzylamine, M.P. 148.0–148.8° C. (corr.) [Anal.—Calcd. for $C_{11}H_{13}ClN_2O_3$: Cl, 13.80; N, 10.90. Found: Cl, 14.55; N, 10.87], N-arbamyl-N-(2-carboxyethyl)-3,4-dichlorobenzylamine, M.P. 153–154° C. [Anal.—Calcd. for $C_{11}H_{12}Cl_2N_2O_3$: Cl, 24.52. Found: Cl, 26.13] and N-carbamyl - N - (2 - carboxyethyl) - 2 - phenylethylamine, M.P. 112–113.5° C. [Anal.—Calcd. for $C_{12}H_{18}N_2O_3$: N, 11.85. Found: N, 11.14], respectively.

Other N-carbamyl-N-(2-carboxyalkyl)-aromatic-alkylamines that can be prepared according to the foregoing procedure used for the preparation of N-carbamyl-N-(2-carboxyethyl)benzylamine using the appropriate N-aralkyl - N - (2 - carbamylalkyl)trichloroacetamide are:

N-carbamyl-N-(2-carboxyethyl)-3,4-dimethoxybenzylamine using N-(3,4-dimethoxybenzyl)-N-(2-carbamylethyl)trichloroacetamide;

N-carbamyl-N-(2-carboxyethyl)-3,4-methylenedioxybenzylamine using N-(3,4-methylenedioxybenzyl)-N-(2-carbamylethyl)trichloroacetamide;

N-carbamyl-N-(2-carboxyethyl)-α-methylbenzylamine using N-(α-methylbenzyl)-N-(2-carbamylethyl)trichloroacetamide;

N-carbamyl-N-(2-carboxyethyl)-2,4-dichlorobenzyl amine using N-(2,4-dichlorobenzyl)-N-(2-carbamylethyl)trichloroacetamide;

N-carbamyl-N-(2-carboxyethyl)-4-n-butoxybenzylamine using N-(4-n-butoxybenzyl)-N-(2-carbamylethyl)trichloroacetamide;

N-carbamyl-N-(2-carboxyethyl)-4-isopropylbenzylamine using N-(4-isopropylbenzyl)-N-(2-carbamylethyl)trichloroacetamide;

N-carbamyl-N-(2-carboxypropyl)3,4-dibromobenzylamine using N-(3,4-dibromobenzyl)-N-(2-carbamylpropyl)trichloroacetamide;

N-carbamyl-N-(2-carboxybutyl)-4-isobutylbenzylamine using N-(4-isobutylbenzyl)-N-(2-carbamylbutyl)trichloroacetamide;

N-carbamyl-N-(2-carboxyethyl)-3,4,5-triiodobenzylamine using N-(3,4,5-triiodobenzyl)-N-(2-carbamylethyl)trichloroacetamide;

N-carbamyl-N-(2-carboxyethyl)-2-(2,4-dichlorophenyl)-ethylamine using N-[2-(2,4-dichlorophenyl)ethyl]-N-(2-carbamylethyl)trichloroacetamide;

N-carbamyl-N-(2-carboxyethyl)-4-(4-chlorophenyl)-butylamine using N-[4-(4-chlorophenyl)butyl]-N-(2-carbamylethyl)trichloroacetamide;

N-carbamyl-N-(2-carboxyethyl)-2-thienylmethylamine using N-(2-thienylmethyl)-N-(2-carbamylethyl)trichloroacetamide;

N-carbamy-N-(2-carboxyethyl)-1-biphenylylmethylamine using N-(1-biphenylylmethyl)-N-(2-carbamylethyl)trichloroacetamide; and the like.

Alternatively, these intermediate N-carbamyl-N-(2-carboxyalkyl)-aromatic-alkylamines can be prepared by hydrolysis of the corresponding N-carbamyl-N-(2-carbalkoxyalkyl)-aromatic-alkylamines [see Example 6B for preparation], as illustrated by the following preparation of N-carbamyl-N-(2-carboxyethyl)benzylamine by hydrolysis of its methyl ester:

A mixture containing 72 g. of N-carbamyl-N-(2-carbomethoxyethyl)benzylamine, 150 cc. of 10% aqueous sodium hydroxide solution and 100 cc. of water was stirred at room temperature for about one hour, at which time complete dissolution resulted, and then allowed to stand at room temperature for another three hours. The solution was then made acid with a slight excess of concentrated hydrochloric acid and was cooled. The solid that separated was collected and dried at 90° C. for three hours to give 60 g. (90% yield) of N-carbamyl-N-(2-carboxyethyl)benzylamine. Hydrolysis of the other N-carbamyl-N-(2-carbalkoxyalkyl)aromatic-alkylamines of Example 6B by the foregoing procedure yields the corresponding respective N-carbamyl-N-(2-carboxyalkyl)-aromatic-alkylamines, e.g., N-carbamyl-N-(2-carboxyethyl)-2-chlorobenzylamine and N-carbamyl-N-(2-carboxyethyl)-1-naphthylmethylamine were prepared from N-carbamyl - N - (2 - carbomethoxyethyl) - 2 - chlorobenzylamine and N-carbamyl-N-(2-carbomethoxyethyl)-1-naphthylmethylamine, respectively.

(B) *N-carbamyl-N-(2-carbalkoxyalkyl)-aromatic-alkylamines*

These intermediate compounds having the formula Ar—Y—N(CONH₂)CH₂CH(R)COO - (lower-alkyl) are novel and are prepared by reacting the corresponding N-(2-carbalkoxyalkyl)-aromatic-alkylamine (see Example 4A) with a carbamylating agent, as illustrated by the following preparations using a water-soluble inorganic cyanate and acetic acid or nitrourea:

A 96.6 g. portion of N-(2-carbomethoxyethyl)benzylamine was dissolved in 600 cc. of water and 35 g. of acetic acid by warming on a steam bath. To this solution was added with stirring 49 g. of potassium cyanate and the resulting reaction mixture was heated, with occasional stirring, for two hours on a steam bath. The reaction mixture was allowed to cool to room temperature; and the solid that separated was collected, washed with water and dried, giving 86 g. (72% yield) of the product, N-carbamyl-N - (2 - carbomethoxyethyl)benzylamine. For analysis, a sample was recrystallized from isopropyl alcohol to give the purified product, M.P. 81.6–83.8° C. (corr.).

*Analysis.*—Calcd. for C₁₂H₁₆N₂O₃; C, 61.00; H, 6.84; N, 11.86. Found: C, 61.30; H, 6.87; N, 11.78.

A mixture containing 9.6 g. of N-(2-carbomethoxyethyl)benzylamine, 6.3 g. of nitrourea and 50 cc. of anhydrous ethanol was stirred with warming to effect complete dissolution of the nitrourea. The reaction mixture was allowed to cool to room temperature. The solution was then evaporated to dryness in vacuo, yielding 10.5 g. of oil that solidified on standing. The solid was recrystallized from isopropyl alcohol to yield the product, N-carbamyl - N-(2 - carbomethoxyethyl)benzylamine, M.P. 78–80° C.

Following the above procedures using the appropriate N-(2-carbalkoxyalkyl)-aromatic-alkylamine and either potassium cyanate and acetic acid or nitrourea as the carbamylating agent, there are obtained the following N-carbamyl-N-(2-carbalkoxyalkyl)-aromatic-alkylamines:

N-carbamyl-N-(2-carbethoxyethyl)-2,4-dichlorobenzylamines;

N-carbamyl-N-(2-carbomethoxyethyl)-4-bromobenzylamine;

N-carbamyl-N-(2-carbomethoxypropyl)-4-n-butoxybenzylamine;

N-carbamyl-N-(2-carbomethoxyethyl)-4-nitrobenzylamine;

N-carbamyl-N-(2-carbomethoxybutyl)-3,4-diethoxybenzylamine;

N-carbamyl-N-(2-carbomethoxyethyl)-3-pyridylmethylamine;

N-carbamyl-N-(2-carbomethoxyethyl)-4-n-hexylbenzylamine;

N-carbamyl-N-(2-carbomethoxyethyl)-4-(4-chlorophenyl)butylamine;

N-carbamyl-N-(2-carbomethoxyethyl)-2-thienylmethylamine;

N-carbamyl-N-(2-carbomethoxyethyl)-1-biphenylylmethylamine; and the like.

(C) *1-(aromatic-alkyl)2,4-dioxohexahydropyrimidines*

The preparation of these compounds by reacting an N-carbamyl-N-(2-carbalkoxyalkyl)-aromatic - alkylamine or an N-carbamyl-N-(2-carboxyalkyl)-aromatic-alkylamine with an acidic agent is illustrated by the following examples.

A mixture containing 5 g. of N-carbamyl-N-(2-carboxyethyl)benzylamine was dissolved in 10 cc. of concentrated hydrochloric acid by warming and stirring, and the resulting solution was allowed to stand at room temperature for about three days. The solid that separated was filtered, washed with water and collected. There was thus obtained 4.0 g. of 1-benzyl-2,4-dioxohexahydropyrimidine, M.P. 125.5–126.5° C., the same product obtained in Example 5. An additional 0.5 g. of the product separated from the filtrate.

A mixture containing 15 g. of N-carbamyl-N-(2-carboxyethyl)benzylamine and 27.5 g. of acetic anhydride was warmed on a steam bath until dissolution resulted. The solution was allowed to cool and stand at room temperature overnight. The solution was then poured with stirring into water; and the solid that separated was collected, washed with water and dried at 90° C., recrystallized from isopropyl alcohol and dried in vacuo at 90° C. to yield 13 g. of the product, 1-benzyl-2,4-dioxohexahydropyrimidine, M.P. 126.4–128.6° C. (corr.), the same product obtained in Example 5.

*Analysis.*—Calcd. for C₁₁H₁₂N₂O₂: N, 13.72. Found: N, 13.63.

1-benzyl-2,4-dioxohexahydropyrimidine was reconverted into N-carbamyl-N-(2-carboxyethyl)benzylamine by dissolving a small sample of it in an excess of 2% aqueous sodium hydroxide solution and allowing the solution to stand overnight (about fifteen hours) at room temperature. The solution was made acid with 6 N aqueous hydrochloric acid and the solid that separated was collected to give N-carbamyl-N-(2-carboxyethyl)benzylamine, M.P. 124–127° C. A mixed melting point with 1-benzyl-2,4-dioxohexahydropyrimidine was depressed.

A mixture containing 14.2 g. of 3-chlorobenzylamine and 9.3 g. of methyl acrylate was allowed to stand at room temperature for twenty-two days. The reaction mixture was taken up in 150 cc. of water, 20 cc. of acetic acid and 5 cc. of 6 N hydrochloric acid. The resulting mixture was heated and 9 g. of potassium cyanate was added to the hot solution and the reaction mixture was allowed to cool and stand at room temperature for about six hours. The oily layer containing N-carbamyl-N-(2 - carbomethoxyethyl) - 3 - chlorobenzylamine was separated, washed with water, dissolved in 75 cc. of isopropyl alcohol, and 30 cc. of concentrated hydrochloric acid was added to the isopropyl alcohol solution. The resulting solution was filtered immediately and allowed to stand overnight at room temperature. The mixture, which contained some solid, was chilled in an ice bath and the solid was collected and dried in vacuo overnight at 70° C. to yield 8.5 g. (36% yield) of the product, 1-(3-chlorobenzyl)-2,4 - dioxohexahydropyrimidine, M.P. 99.4–103.8° C. (corr.).

*Analysis.*—Calcd. for $C_{11}H_{11}ClN_2O_2$: N, 11.71; O, 13.40. Found: N, 11.46; O, 13.25.

The intraperitoneal median effective dose ($PD_{50}$) of 1-(3-chlorobenzyl) - 2,4 - dioxohexahydropyrimidine necessary to protect mice from the hind limb extensor component of maximal electroshock seizures was found to be 60±10.9 mg. per kg. using essentially the method of Swinyard et al.

Other 1-(aromatic-alkyl)-2,4 - dioxohexahydropyrimidines that can be prepared according to the foregoing procedures using the appropriate N-carbamyl-N-(2-carbalkoxyalkyl)-
  aromatic-alkylamine or
N-carbamyl-N-(2-carboxyalkyl)aromatic-
  alkylamine are:
1-(4-bromobenzyl)2,4-dioxohexahydropyrimidine;
1-(4-nitrobenzyl)-2,4-dioxohexahydropyrimidine;
1-(2-biphenylylmethyl)-2,4-dioxohexahydropyrimidine;
1-(2-thienylmethyl)-2,4-dioxohexahydropyrimidine;
1-(3-pyridylmethyl)-2,4-dioxohexahydropyrimidine;
and the like.

EXAMPLE 7

(A) *N-(2-carbomethoxypropyl)benzylamine*

A mixture containing 21.4 g. of benzylamine and 20 g. of methyl methacrylate was allowed to stand at room temperature for twelve days and then was distilled in vacuo. There was thus obtained 16 g. (39% yield) of N-(2-carbomethoxypropyl)benzylamine, B.P. 136–140° C. at 7 mm., $n_D^{25}=1.5059$.

*Analysis.*—Calcd. for $C_{12}N_{27}NO_2$: N, 6.76. Found; N, 6.77.

(B) *1-benzyl-5-methyl-2,4-dioxohexahydropyrimidine*

To a solution containing 16 g. of N-(2-carbomethoxypropyl)benzylamine, 70 cc. of water and 10 cc. of acetic acid was added with stirring 8.1 g. of potassium cyanate and the resulting mixture was warmed on a steam bath for about four hours, and allowed to stand at room temperature another four hours. The supernatant liquid was decanted and the oily layer, comprising essentially N-carbamyl - N - (2 - carbomethoxypropyl)benzylamine, was washed with water; and then 100 cc. of water and 15 cc. of 10% aqueous sodium hydroxide solution was added and the resulting layer was shaked for about five minutes and then filtered. To the filtrate containing N-carbamyl - N - (2 - carboxypropyl)benzylamine was added 6 N hydrochloric acid until the solution was just acid. The oil that separated was collected, washed with water and allowed to stand whereupon it solidified. The solid was recrystallized twice from isopropyl alcohol yielding 4 g. of product, 1-benzyl - 5 - methyl - 2,4-dioxohexahydropyrimidine, M.P. 104.8–108.2° C. (corr.).

*Anal.*—Calcd. for $C_{12}H_{14}N_2O_2$:C, 66.10; H, 6.48; O, 14.68. Found: C, 65.61, 66.08; H, 6.30, 6.21; O, 14.55.

When administered intraperitoneally as a suspension in an aqueous 1% gum tragacanth solution, the median effective dose ($PD_{50}$) of 1-benzyl-5-methyl-2,4-dioxohexahydropyrimidine necessary to prevent death of mice which were treated with lethal doses ($LD_{100}$) of strychnine hydrochloride given intravenously sixty minutes after administration of the dioxohexahydropyrimidine was found to be 57±8.9 mg. per kg. The intraperitoneal median effective dose ($PD_{50}$) of 1-benzyl-5-methyl-2,4-dioxohexahydropyrimidine necessary to protect mice from the hind limb extensor component of maximal electroshock seizures was found to be 116±14.6 mg. per kg. using essentially the method of Swinyard et al. 1-benzyl-5-methyl-2,4-dioxohexahydropyrimidine was found to have an acute intraperitoneal toxicity ($LD_{50}$) in mice of 600±130 mg. per kg.

EXAMPLE 8

*1-(2,4-dichlorobenzyl)-2,4-dioxohexahydropyrimidine*

The preparation of this compound was carried out following the procedure described in Example 2B using 18 g. of N-(2-carbamylethyl) - N - (2,4 - dichlorobenzyl)trichloroacetamide, 100 cc. of 0.5 N sodium hydroxide solution and 100 cc. of ethylene dichloride. There was thus obtained 9.5 g. of 1-(2,4-dichlorobenzyl)-2,4-dioxohexahydropyrimidine, M.P. 186.4–188.0° C. (corr.) when recrystallized from isopropyl alcohol.

*Anal.*—Calcd. for $C_{11}H_{10}Cl_2N_2O_2$: Cl, 25.96; N, 10.26. Found: Cl, 26.15; N, 10.08.

1 - (2,4 - dichlorobenzyl) - 2,4 - dioxohexahydropyrimidine was also prepared following the procedure described in Example 6C for the preparation of 1-(3-chlorobenzyl)-2,4-dichlorobenzylamine and 47 g. of methyl acrylate; taking up the reaction mixture after fifteen days in 500 cc. of water, 30 cc. of acetic acid, 30 cc. of 6 N hydrochloric acid, 46 g. of potassium cyanate to form N-carbamyl-N-(2-carbomethoxyethyl)-2,4-dichlorobenzylamine; and then warming a solution of N-carbamyl-N-(2-carbomethoxyethyl)-2,4-dichlorobenzylamine in 200 cc. of isopropyl alcohol and 100 cc. of concentrated hydrochloric acid on a steam bath for about ten minutes. There was thus obtained 62 g. (45% yield) of the product, 1-(2,4-dichlorobenzyl)-2,4-dioxohexahydropyrimidine, M.P. 186.4–188.8° C. (corr.).

*Anal.*—Calcd. for $C_{11}H_{10}Cl_2N_2O_2$: N, 10.26. Found: N, 10.08.

When administered intraperitoneally as a suspension in an aqueous 1% gum tragacanth solution, the median effective dose ($PD_{50}$) of 1-(2,4-dichlorobenzyl)-2,4-dioxohexahydropyrimidine necessary to prevent death of mice which were treated with lethal doses ($LD_{100}$) of strychnine hydrochloride given intravenously sixty minutes after administration of the dioxohexahydropyrimidine was found to be 34.7±4.6 mg. per kg. The intraperitoneal median effective dose ($PD_{50}$) of 1-(2,4-dichlorobenzyl)-2,4-dioxohexahydropyrimidine necessary to protect mice from the hind limb extensor component of maximal electroshock seizures was found to be 65±6.8 mg. per kg. using essentially the method of Swinyard et al. 1-(2,4-dichlorobenzyl)-2,4-dioxohexahydropyrimidine was found to have an acute intraperitoneal toxicity ($LD_{50}$) in mice of 880 ±141 mg. per kg.

EXAMPLE 9

*1-(3,4-dichlorobenzyl)-2,4-dioxohexahydropyrimidine*

This preparation was carried out following the procedure described in Example 7B using 13 g. of N-(2-carbomethoxyethyl)-3,4-dichlorobenzylamine, 4.9 g. of potassium cyanate, 10 cc. of acetic acid and 100 cc. of water. There was first obtained N-carbamyl-N-(2-carbomethoxyethyl)-3,4-dichlorobenzylamine which was converted into the corresponding N-carbamyl-N-(2-carboxyethyl)-3,4-dichlorobenzylamine with 100 cc. of 5% sodium hydroxide solution, which when treated with 6N hydrochloric acid solution as in Example 7B was converted into the desired product. There was thus obtained 2 g. of 1-(3,4-dichlorobenzyl) - 2,4 - dioxohexahydropyrimidine, M.P. 152.8–155–6° C. (corr.) when recrystallized twice from isopropyl alcohol.

*Anal.*—Calcd. for $C_{11}H_{10}Cl_2N_2O_2$: Cl, 25.96; N, 10.26. Found: Cl, 25.99; N, 10.31.

The above product was also prepared directly by treating N-carbamyl-N-(2-carbomethoxyethyl) - 3,4 - dichlorobenzylamine with hydrochloric acid as follows: 35.2 g. of 3,4-dichlorobenzylamine and 19 g. of methyl acrylate were mixed and allowed to stand at room temperature for nine days. The reaction mixture was dissolved in 200 cc. of water containing 20 cc. of acetic acid. To this solution containing N-(2-carbomethoxyethyl) - 3,4 - dichlorobenzylamine was added 10 cc. of concentrated hydrochloric acid with heating; 18 g. of potassium cyanate was added; and the reaction mixture was heated on a steam for one hour whereupon there separated an oily layer comprising essentially the intermediate N-carbamyl-N-(2-carbomethoxyethyl) - 3,4 - dichlorobenzylamine. The aqueous and oily layers were treated separately as follows. The aqueous layer, which also contained some of acid intermediate N-carbamyl compound, was decanted while hot; 20 cc. of concentrated hydrochloric acid was added; the resulting solution was allowed to stand at room temperature and then cooled after the precipitate began to form after about two hours; and the mixture was then cooled and the solid collected. The oily layer from the reaction mixture was taken up in 150 cc. of ethanol; 40 cc. of concentrated hydrochloric acid was added; the resulting solution was allowed to stand at room temperature; and the solid that separated was collected. The solids obtained from the aqueous and oil layers were combined, recrystallized from isopropyl alcohol, washed with n-pentane, and dried at about 90° C. for four hours to yield 23 g. of 1-(3,4-dichlorobenzyl)-2,4-dioxohexahydropyrimidine, M.P. 154.2–156.2° C. (corr.).

*Anal.*—Calcd. for $C_{11}H_{10}Cl_2N_2O_2$: N, 10.26. Found: N, 10.25.

When administered intraperitoneally as a suspension in an aqueous 1% gum tragacanth solution, the median effective dose ($PD_{50}$) of 1-(3,4-dichlorobenzyl)-2,4-dioxohexahydropyrimidine necessary to prevent death of mice which were treated with lethal doses ($LD_{100}$) of strychnine hydrochloride given intravenously sixty minutes after administration of the dioxohexahydropyrimidine was found to be 130±14.1 mg. per kg. The intraperitoneal median effective dose ($PD_{50}$) of 1-(3,4-dichlorobenzyl)-2,4-dioxohexahydropyrimidine necessary to protect mice from the hind limb extensor component of maximal electroshock seizures was found to be 71±9.5 mg. per kg. using essentially the method of Swinyard et al.

EXAMPLE 10

*1-benzhydryl-2,4-dioxohexahydropyrimidine*

A mixture containing 22 g. of N-(2-carbomethoxyethyl)benzhydrylamine, 8.5 g. of nitrourea and 150 cc. of ethanol was heated on a steam bath for six hours in an open container. All of the solvent had evaporated at the end of this period and the remaining oil solidified on standing. This solid, N-carbamyl-N-(2-carbomethoxyethyl)benzhydrylamine, was taken up in 130 cc. of ethanol; 20 cc. of concentrated hydrochloric acid was added; the resulting solution was filtered; and the filtrate heated on a steam bath for one hour. The reaction mixture was cooled and the solid that separated was recrystallized from isopropyl alcohol to yield 7 g. of 1-benzhydryl-2,4-dioxohexahydropyrimidine, M.P. 174.4–177.2° C. (corr.).

*Anal.*—Calcd. for $C_{17}H_{16}N_2O_2$: C, 72.86; H, 5.75; N, 9.98. Found: C, 72.76; H, 5.71; N, 9.87.

When administered intraperitoneally as a suspension in an aqueous 1% gum tragacanth solution, the median effective dose ($PD_{50}$) of 1-benzhydryl-2,4-dioxohexahydropyrimidine necessary to prevent death of mice which were treated with lethal doses ($LD_{100}$) of strychnine hydrochloride given intravenously sixty minutes after administration of the dioxohexahydropyrimidine was found to be 245±66 mg. per kg. The intraperitoneal median effective dose ($PD_{50}$) of 1-benzhydryl-2,4-dioxohexahydropyrimidine necessary to protect mice from the hind limb extensor component of maximal electroshock seizures was found to be 48±8.5 mg. per kg. using essentially the method of Swinyard et al.

EXAMPLE 11

*1-(2,3,4,5,6-pentachlorobenzyl)-2,4-dioxohexahydropyrimidine*

This preparation was carried out following the procedure described in Example 10 using 15.5 g. of N-(2-carbomethoxyethyl)-2,3,4,5,6-pentachlorobenzylamine, 5.2 g. of nitrourea and 150 cc. of ethanol, with a heating period on a steam bath of three hours. There was obtained 16 g. (92% yield) of the intermediate N-carbamyl-N-(2-carbomethoxyethyl) - 2,3,4,5,6 - pentachlorobenzylamine, M.P. 148–151° C. This intermediate was taken up in 150 cc. of anhydrous ethanol; 15 cc. of concentrated hydrochloric acid was added to the boiling alcohol solution; and heating on a steam bath was continued for about thirty minutes. The solid that separated was collected by filtering the hot reaction mixture, recrystallized from acetic acid, washed with ethanol and dried at 90° C. for three hours. There was thus obtained 9 g. of 1-(2,3,4,5,6-pentachlorobenzyl) - 2,4 - dioxohexahydropyrimidine, M.P. 254.2–257.4° C. (corr.).

*Anal.*—Calcd. for $C_{11}H_7Cl_5N_2O_2$: Cl, 47.12; N, 7.45. Found: Cl, 46.92; N, 7.37.

EXAMPLE 12

*1-[α-(4-chlorophenyl)benzyl]-2,4-dioxohexahydropyrimidine*

This preparation was carried out following the procedure described in Example 10 using 13 g. of N-(2-carbomethoxyethyl)-α-(4-chlorophenyl)benzylamine, 5 g. of nitrourea and 100 cc. of ethanol, with a heating period on a steam bath for about four hours. The resulting intermediate N-carbamyl-N-(2-carbomethoxyethyl)-α-(4-chlorophenyl)benzylamine was obtained as a solid and without further purification was dissolved in 10 cc. of concentrated hydrochloric acid and the resulting solution heated on a steam bath for about three hours and then allowed to stand at room temperature overnight. The solid that separated was collected and recrystallized twice from isopropyl alcohol to yield the product, 1-[α-(4-chlorophenyl)benzyl]-2,4 - dioxohexahydropyrimidine, M.P. 186.8–188.4° C. (corr.).

*Anal.*—Calcd. for $C_{17}H_{15}ClN_2O_2$: Cl, 11.26; N, 8.88. Found: Cl, 11.45; N. 8.75.

The intraperitoneal median effective dose ($PD_{50}$) of 1-[α-(4-chlorophenyl)benzyl]-2,4- dioxohexahydropyrimidine necessary to protect mice from the hind limb extensor component of maximal electroshock seizures was found to be 200 mg. per kg. using essentially the method of Swinyard et al.

EXAMPLE 13

*1-(1-naphthylmethyl)-2,4-dioxohexahydropyrimidine*

To a solution containing 33.5 g. of N-(2-carbomethoxyethyl)-1-naphthylmethylamine hydrochloride in 300 cc. of hot water, 40.9 g. of sodium acetate trihydrate was added and enough acetic acid (5–10 cc.) was added to bring the oil that separated back into solution and 12.2 g. of potassium cyanate was added with stirring to the hot solution. An oil separated immediately and the reaction mixture was allowed to stand at room temperature for three hours. The water was decanted from the oily layer, comprising essentially N-carbamyl-N-(2 - carbomethoxyethyl)-1-naphthylmethylamine, which was then taken up in 5% aqueous potassium hydroxide solution whereupon a solid separated (began to form even before all of the oil was in solution). The mixture was allowed to stand at room temperature for thirty minutes and the solid that separated was collected and used without further purification after drying. This solid was the potassium salt of N-carbamyl-N-(2-carboxyethyl) - 1 - naphthylmethylamine. The potassium salt was suspended in water; an excess of concentrated hydrochloric acid was added; and the resulting mixture was allowed to stand at room temperature overnight. The solid that separated was collected and dried; this solid was N-carbamyl-N-(2-carboxyethyl)-1-naphthylmethylamine. This acid was heated with 70 cc. of acetic anhydride. The ensuing action was spontaneous and all of the solid had gone into solution after about five minutes. The resulting solution was allowed to stand for about three hours after which time some precipitate had formed. This mixture was poured with stirring into one liter of water whereupon more solid separated. The mixture was allowed to stand at room temperature for about two hours; and the solid was collected, washed with water, recrystallized from acetic acid and dried overnight at 90° C. to yield the product, 1-(1-naphthylmethyl)-2,4-dioxohexahydropyrimidine, M.P. 228.8–231.2° C. (corr).

*Anal.*—Calcd. for $C_{15}H_{14}N_2O_2$: C, 70.82; H, 5.56; N, 11.02. Found: C, 71.10; H, 5.37; N, 10.99.

EXAMPLE 14

*1-(2-pyridylmethyl)2,4-dioxohexahydropyrimidine*

A mixture containing 18 g. of N-(2-carbomethoxyethyl)-2-pyridylmethylamine, 8.1 g. of potassium cyanate, 6 g. of acetic acid and 50 cc. of water was warmed in an open container on a steam bath for about four hours, after which time the volume had evaporated to about 20 cc. The reaction mixture was allowed to stand overnight at room temperature, whereupon some solid separated. The mixture was cooled in an ice bath, the solid collected by filtration and recrystallized from isopropyl alcohol to yield 8 g. (36% yield) of N-carbamyl-N-(2-carbomethoxyethyl)-2-pyridylmethylamine, M.P. 157–158.5° C., which was used directly without further purification.

A mixture containing 8 g. of N-carbamyl-N-(2-carbomethoxyethyl)-2-pyridylmethylamine and 5 cc. of concentrated hydrochloric acid was warmed on a steam bath for about thirty minutes after which time all of the solid had dissolved. The solution was then allowed to cool and to stand overnight at room temperature. The resulting mixture (some solid had separated) was poured with stirring into 20 cc. of isopropyl alcohol and the resulting solid was collected, recrystallized from methanol and dried at 90° C. for one hour to give 6 g. (72% yield) of 1-(2-pyridylmethyl)-2,4-dioxohexahydropyrimidine as its hydrochloride, M.P. 245.0–251.6° C. (corr.).

*Anal.*—Calcd. for $C_{10}H_{11}N_3O_2 \cdot HCl$: C, 49.70; H, 5.00; Cl, 14.68. Found: C, 49.63; H, 5.27; Cl, 14.68.

When administered intraperitoneally as a suspension in an aqueous 1% gum tragacanth solution, the median effective dose ($PD_{50}$) of 1-(2-pyridylmethyl)-2,4-dioxohexahydropyrimidine necessary to prevent death of mice which were treated with lethal doses ($LD_{100}$ of strychnine hydrochloride given intravenously sixty minutes after administration of the dioxohexahydropyrimidine was found to be 218±32 mg. per kg.

EXAMPLE 15

*1-(2-furylmethyl)-2,4-dioxohexahydropyrimidine*

A mixture containing 28 g. of N-(2-carbomethoxyethyl)-2-furylmethylamine, 10.8 g. of acetic acid, 100 cc. of water and 14.5 g. of potassium cyanate was warmed on a steam bath for about thirty minutes, whereupon a yellow oily layer separated. The aqueous layer was decanted; and the oily layer, comprising essentially N-carbamyl-N-(2-carbomethoxyethyl)-2-furylmethylamine, was dissolved in a minimum quantity of 10% aqueous potassium hydroxide solution and allowed to stand at room temperature for about ten minutes to yield a solution containing N-carbamyl-N-(2-carboxyethyl)-2-furylmethylamine. To this solution was added excess concentrated hydrochloric acid whereupon there separated an oil which solidified on standing. The solid was collected, washed with water and recrystallized twice from isopropyl alcohol to yield 8 g. of 1-(2-furylmethyl)-2,4-dioxohexahydropyrimidine, M.P. 110.4–113.2° C. (corr.).

*Anal.*—Calcd. for $C_9H_{10}N_2O_3$: C, 55.70; H, 5.18; N, 14.40. Found: C, 55.99; H, 5.16; N, 14.44.

EXAMPLE 16

*1-(2-phenylethyl)2,4-dioxohexahydropyrimidine*

A mixture containing 3 g. of N-carbamyl-N-(2-carboxyethyl)-2-phenylethylamine and 5.4 g. of acetic anhydride was warmed on a steam bath until dissolution was completed; and the resulting solution was allowed to stand at room temperature overnight. The reaction layer was poured into water with stirring; and the solid that separated was collected, washed with water and dried at 90° C. for five hours to yield 1.5 g. (53% yield) of 1-(2-phenylethyl)-2,4-dioxohexahydropyrimidine, M.P. 121.8–124.2° C. (corr.).

*Anal.*—Calcd. for $C_{12}H_{14}N_2O_2$: N, 12.80; O, 14.65. Found: N, 12.70; O, 15.00.

When administered intraperitoneally as a suspension in an aqueous 1% gum tragacanth solution, the median effective dose ($PD_{50}$) of 1-(2-phenylethyl)-2,4-dioxohexahydropyrimidine necessary to prevent death of mice which were treated with lethal doses ($LD_{100}$) of strychnine hydrochloride given intravenously sixty minutes after administration of the dioxohexahydropyrimidine was found to be 190±27.8 mg. per kg. The intraperitoneal median effective dose ($PD_{50}$) of 1-(2-phenylethyl)-2,4-dioxohexahydropyrimidine necessary to protect mice from the hind limb extensor component of maximal electroshock seizures was found to be 192±2.8 mg. per kg. using essentially the method of Swinyard et al. 1-(2-phenylethyl)-2,4-dioxohexahydropyrimidine was found to have an acute intraperitoneal toxicity ($ALD_{50}$) in mice of 375 mg. per kg.

EXAMPLE 17

*1-(2-n-propoxybenzyl)-2,4-dioxohexahydropyrimidine*

This compound was prepared following the procedure described in Example 9 by first allowing a mixture containing 33 g. of 2-n-propoxybenzylamine and 19 g. of methyl acrylate to stand at room temperature for fourteen days, taking the reaction mixture containing N-(2-carbomethoxyethyl)-2-n-propoxybenzylamine up in 150 cc. of water, adding 15 cc. of acetic acid and 17.8 g. of potassium cyanate with stirring, and heating the resulting mixture on a steam bath for five hours. The reaction mixture was then allowed to stand at room temperature for three days and the aqueous layer was decanted from the oily layer comprising essentially N-carbamyl-N-(2-carbomethoxyethyl)-2-n-propoxybenzylamine. The oily layer was taken up in 100 cc. of ethanol; 50 cc. of concentrated hydrochloric acid was added; and the reaction mixture was allowed to stand at room temperature for about one week. The solution was then concentrated to one-half its volume and the solid that separated was collected and recrystallized from isopropyl alcohol to yield 6 g. of 1-(2-n-propoxybenzyl)-2,4-dioxohexahydropyrimidine, M.P. 117.0–120.8° C. (corr.).

*Anal.*—Calcd. for $C_{14}H_{18}N_2O_3$: C, 64.13; H, 6.91; N, 10.68. Found: C, 64.21; H, 6.77; N, 10.54.

EXAMPLE 18

*1-(3,4-dimethoxybenzyl)-2,4-dioxohexahydropyrimidine*

This preparation was prepared following the procedure described in Example 1B using 14.5 g. of N-(2-carbamylethyl)-3,4-dimethoxybenzylamine hydrochloride, 150 cc. of 1N sodium hydroxide solution, 150 cc. of ethylene dichloride and 14.5 g. of trichloroacetyl chloride. There was thus obtained 4.5 g. of 1-(3,4-dimethoxybenzyl)-2,4-dioxohexahydropyrimidine, M.P. 159.1–160.0° C. (corr.) when recrystallized three times from isopropyl alcohol and once from benzene plus a few drops of ethanol.

*Anal.*—Calcd. for $C_{13}H_{16}N_2O_4$: C, 59.07; H, 6.10; N, 10.60. Found: C, 58.69; H, 6.03; N, 10.71.

EXAMPLE 19

1-[2-(3,4-dimethoxyphenyl)ethyl]-2,4-dioxohexahydropyrimidine

This compound was prepared following the procedure described in Example 1B using 28.8 g. of N-(2-carbamylethyl) - 2 - (3,4 - dimethoxyphenyl)ethylamine hydrochloride, 200 cc. of sodium hydroxide solution, 200 cc. of ethylene dichloride and 20.0 g. of trichloroacetyl chloride. The product thus obtained was 1-[2-(3,4-dimethoxyphenyl)ethyl] - 2,4 - dioxohexahydropyrimidine, M.P. 117.6–120.6° C. (corr.) when recrystallized three times from isopropyl alcohol.

*Anal.*—Calcd. for $C_{14}H_{18}N_2O_4$: C, 60.41; H, 6.52; N, 10.07. Found: C, 60.06; H, 6.44; N, 9.95.

When administered intraperitoneally as a suspension in an aqueous 1% gum tragacanth solution, the median effective dose ($PD_{50}$) of 1-[2-(3,4-dimethoxyphenyl)ethyl]-2,4-dioxohexahydropyrimidine necessary to prevent death of mice which were treated with lethal doses ($LD_{100}$) of strychnine hydrochloride given intravenously sixty minutes after administration of the dioxohexahydropyrimidine was found to be 200 mg. per kg. 1-[2-(3,4-dimethoxyphenyl)ethyl] - 2,4 - dioxohexahydropyrimidine was found to have an acute intraperitoneal toxicity ($LD_{50}$) in mice of 1180±129 mg. per kg.

EXAMPLE 20

1-(4-n-butoxybenzyl)-2,4-dioxohexahydropyrimidine

This compound was prepared following the procedure described in Example 1B using 13.2 g. of N-(2-carbamylethyl)-4-n-butoxybenzylamine hydrochloride, 150 cc. of 1 N sodium hydroxide solution, 150 cc. of ethylene dichloride and 9.1 g. of trichloroacetyl chloride. The product thus obtained was 1-(4-n-butoxybenzyl)-2,4-dioxohexahydropyrimidine, M.P. 132.8–135.2° C. (corr.) when recrystallized twice from isopropyl alcohol.

*Anal.*—Calcd. for $C_{15}H_{20}N_2O_3$: C, 65.23; H, 7.30; N, 10.14. Found: C, 65.33; H, 7.49; N, 9.86.

EXAMPLE 21

1-(4-methylbenzyl)-2,4-dioxohexahydropyrimidine

This preparation was carried out following the procedure described in Example 3 using 3 g. of N-(2-carbamylethyl)-4-methylbenzylamine hydrochloride, 1.6 g. of potassium cyanate and 5 cc. of water. There was thus obtained 1.5 g. of 1-(4-methylbenzyl)-2,4-dioxohexahydropyrimidine, M.P. 145.2–146.2° C. (corr.) when recrystallized from isopropyl alcohol.

*Anal.*—Calcd. for $C_{12}H_{14}N_2O_2$: C, 66.10; H, 6.48; N, 12.83. Found: C, 66.12; H, 6.40; N, 13.14.

When administered intraperitoneally as a suspension in an aqueous 1% gum tragacanth solution, the median effective dose ($PD_{50}$) of 1-(4-methylbenzyl)-2,4-dioxohexahydropyrimidine necessary to prevent death of mice which were treated with lethal doses ($LD_{100}$) of strychnine hydrochloride given intravenously sixty minutes after administration of the dioxohexahydropyrimidine was found to be 400±66 mg. per kg. The intraperitoneal median effective dose ($PD_{50}$) of 1-(4-methylbenzyl)-2,4-dioxohexahydropyrimidine necessary to protect mice from the hind limb extensor component of maximal electroshock seizures was found to be 400±64 mg. per kg. using essentially the method of Swinyard et al.

EXAMPLE 22

1-(aromatic-alkyl)-2,4-dioxohexahydropyrimidines

The preparation of these compounds by heating an N-(2-carbalkoxyalkyl)-aromatic-alkylamine or an N-(2-carbamylalkyl)-aromatic-alkylamine with urea is illustrated by the following preparations.

A mixture of 23.5 g. of N-(2-carbomethoxyethyl)-4-isopropylbenzylamine and 12 g. of urea was heated with stirring in an oil bath kept at 160–170° C. for about thirty minutes, at the end of which time the original two layers had combined into one and the evolution of gas had ceased. The reaction mixture was then heated with stirring at 220° C. for about forty-five minutes. The reaction mixture was then cooled to room temperature and the resulting solid was recrystallized twice from isopropyl alcohol to give 11 g. (45% yield) of 1-(4-isopropylbenzyl)-2,4 - dioxohexahydropyrimidine, M.P. 155.1–156.3° C. (corr.).

*Anal.*—Calcd. for $C_{14}H_{18}N_2O_2$: C, 68.28; H, 7.37; N, 11.38. Found: C, 68.49; H, 7.30; N, 11.48.

A mixture of 11 g. of N-(2-carbamylethyl)-4-isopropylbenzylamine and 6 g. of urea was heated with stirring to 220° C. for two hours, after which time gas evolution had ceased. The reaction mixture was cooled and taken up in hot isopropyl alcohol; the resulting solution was treated with decolorizing charcoal and cooled; and the solid that separated was recrystallized from methanol to yield the product, 1-(4-isopropylbenzyl)-2,4-dioxohexahydropyrimidine. A mixed melting point of this material with the product obtained above by heating N-(2-carbomethoxyethyl) - 4 - isopropylbenzylamine and urea gave no depression.

1 - (4 - isopropylbenzyl) - 2,4 - dioxohexahydropyrimidine was also prepared following the procedure described in Example 1B using 10 g. of N-(2-carbamylethyl)-4-isopropylbenzylamine hydrochloride, 125 cc. of 1 N sodium hydroxide solution, 150 cc. of ethylene dichloride and 10 g. of trichloroacetyl chloride. The product melted at 147–149.5° C. when recrystallized twice from isopropyl alcohol and once from benzene.

*Anal.*—Calcd. for $C_{14}H_{18}N_2O_2$: C, 68.28; H, 7.37; N, 11.38. Found: C, 68.42; H, 7.54; N, 11.45.

When administered intraperitoneally as a suspension in an aqueous 1% gum tragacanth solution, the median effective dose ($PD_{50}$) of 1-(4-isopropylbenzyl)-2,4-dioxohexahydropyrimidine necessary to prevent death of mice which were treated with lethal doses ($LD_{100}$) of strychnine hydrochloride given intravenously sixty minutes after administration of the dioxohexahydropyrimidine was found to be 200 mg. per kg. 1-(4-isopropylbenzyl)-2,4-dioxohexahydropyrimidine was found to have an acute intraperitoneal toxicity greater than 4000 mg. per kg.

Following the above procedures using the N-(2-carbalkoxyalkyl)-aromatic-alkylamines of Example 4A, or the N-(2-carbamylalkyl)-aromatic-alkylamines of Example 1A, there can be obtained the respective 1-(aromatic-alkyl)-2,4-dioxohexahydropyrimidines of Examples 4B and 1B.

EXAMPLE 23

1-(2,2-diphenylethyl)-2,4-dioxohexahydropyrimidine

This compound was prepared following the procedure described in Example 10 first using 28.3 g. of N-(2-carbomethoxyethyl)-2,2-diphenylethylamine [prepared by mixing 19.7 g. of 2,2-diphenylethylamine and 9.5 g. of methyl acrylate with heating to effect dissolution and allowing the reaction mixture to stand at room temperature for fourteen days], 10.5 g. of nitrourea and 150 cc. of ethanol. There was thus first obtained the intermediate N - carbamyl - N - (2 - carbomethoxyethyl) - 2,2 - diphenylethylamine which was then heated with 25 cc. of concentrated hydrochloric acid to give 20 g. (68% yield) of 1 - (2,2 - diphenylethyl) - 2,4 - dioxohexahydropyrimidine, M.P. 148.6–150.6° C. (corr.).

Anal.—Calcd. for $C_{18}H_{18}N_2O_2$: C, 73.46; H, 6.16; N, 9.52. Found: C, 73.01; H, 6.38; N, 9.48.

EXAMPLE 24

1-(aromatic-alkyl)-5-halo-2,4-dioxohexahydropyrimidines

The preparation of these compounds by reacting a 1-(aromatic-alkyl) - 2,4-dioxohexahydropyrimidine with a halogenating agent is illustrated by the following preparation of 1-benzyl-5-bromo-2,4-dioxohexahydropyrimidine: A mixture containing 23.0 g. of 1-benzyl-2,4-dioxohexahydropyrimidine, 20.3 g. of bromine and 180 cc. of chloroform was heated in a sealed tube at 100° C. for one hour. The reaction mixture was allowed to cool to room temperature, removed from the tube and treated with 10 g. of potassium carbonate and 5 cc. of water. The mixture was filtered and the filtrate evaporated to yield a solid which was taken up in a minimum amount of 5% aqueous sodium hydroxide solution. The solution was filtered and acidified with 6 N hydrochloric acid solution, yielding a solid which was collected and recrystallized twice from isopropyl alcohol. There was thus obtained 2.5 g. of 1-benzyl-5-bromo-2,4-dioxohexahydropyrimidine, M.P. 160.2–163.2° C. (corr.).

Anal.—Calcd. for $C_{11}H_{11}BrN_2O_2$: Br, 28.20; O, 11.30. Found: Br, 27.95; O, 11.55.

When administered intraperitoneally as a suspension in an aqueous 1% gum tragacanth solution, the median effective dose ($PD_{50}$) of 1-benzyl-5-bromo-2,4-dioxohexahydropyrimidine necessary to prevent death of mice which were treated with lethal doses ($LD_{100}$) of strychnine hydrochloride given intravenously sixty minutes after administration of the dioxohexahydropyrimidine was found to be 152±16 mg. per kg. 1-benzyl-5-bromo-2,4-dioxohexahydropyrimidine was found to have an acute intraperitoneal toxicity ($ALD_{50}$) in mice of 875 mg. per kg.

Other 1-(aromatic-alkyl)-5-bromo-2,4-dioxohexahydropyrimidines that can be prepared according to the foregoing procedure used for the preparation of 1-benzyl-5-bromo - 2,4-dioxohexahydropyrimidine using the corresponding 1 - (aromatic-alkyl)-2,4-dioxohexahydropyrimidine and brominating agent, e.g., bromine, are:

1-(4-chlorobenzyl)-5-bromo-2,4-dioxohexahydropyrimidine;
1-(2,4-dichlorobenzyl)-5-bromo-2,4-dioxohexahydropyrimidine;
1-(3,4-dibromobenzyl)-5-bromo-2,4-dioxohexahydropyrimidine;
1-[2-(4-nitrophenyl)ethyl]-5-bromo-2,4-dioxohexahydropyrimidine;
1-(3,4-dimethoxybenzyl)-5-bromo-2,4-dioxohexahydropyrimidine;
1-(4-methylbenzyl)-5-bromo-2,4-dioxohexahydropyrimidine;
1-(4-isopropylbenzyl)-5-bromo-2,4-dioxohexahydropyrimidine;
1-(4-acetylaminobenzyl)-5-bromo-2,4-dioxohexahydropyrimidine;
1-(1-naphthylmethyl)-5-bromo-2,4-dioxohexahydropyrimidine;
1-(2-pyridylmethyl)-5-bromo-2,4-dioxohexahydropyrimidine;
1-(2-furylmethyl)-5-bromo-2,4-dioxohexahydropyrimidine;
1-(1-biphenylylmethyl)-5-bromo-2,4-dioxohexahydropyrimidine;
1-(2-thienylmethyl)-5-bromo-2,4-dioxohexahydropyrimidine;
1-(α-methylbenzyl)-5-bromo-2,4-dioxohexahydropyrimidine;
1-(benzhydryl)-5-bromo-2,4-dioxohexahydropyrimidine;
1-[α-(4-chlorophenyl)benzyl]-5-bromo-2,4-dioxohexahydropyrimidine;
1-(2,2-diphenylethyl)-5-bromo-2,4-dioxohexahydropyrimidine;

and the like.

Use of a suitable chlorinating agent, e.g., sulfuryl chloride, in place of bromine in the above examples yields the corresponding 1 - (aromatic - alkyl) - 5-chloro-2,4-dioxohexahydropyrimidines, e.g., 1-benzyl-5-chloro-2,4-dioxohexahydropyrimidine using 1-benzyl-2,4-dioxohexahydropyrimidine and sulfuryl chloride.

Pharmacological evaluation of the 1-(aromatic-alkyl)-2,4-dioxohexahydropyrimidines of our invention indicate their usefulness as central nervous system depressants, in particular, as anticonvulsants. The compounds can be prepared for oral administration in solid form with the aid of a carrier. Thus, the compounds can be formulated in unit dosage form as tablets in combination with a suitable adjuvant such as one or more of the following: calcium carbonate, starch, gelatin, talc, magnesium stearate, acacia, and the like; or, alternatively, they can be employed in capsule form either alone or admixed with an adjuvant. Alternatively, the compounds can be formulated for oral administration as an aqueous suspension, aqueous-alcohol solutions, oil solutions, or oil-water emulsions, in the same manner in which conventional medicinal substances are formulated.

We claim:

1. A process for the preparation of a 1-aromatic-alkyl-2,4-dioxohexahydropyrimidine having the structural formula

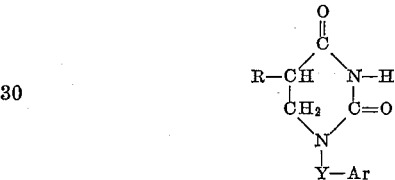

where R is a member selected from the group consisting of H and a lower-alkyl radical, Ar is a member selected from the group consisting of phenyl, naphthyl, biphenylyl, furyl, pyridyl and thienyl radicals and Y is a lower-alkylene radical which can be substituted further by a second aromatic radical Ar, which comprises reacting an N-(2-carbamylalkyl) - N - (aromatic-alkyl)trichloroacetamide having the formula

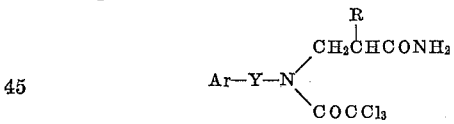

with an alkaline agent.

2. A process for the preparation of a 1-arylmethyl-2,4-dioxohexahydropyrimidine having the structural formula

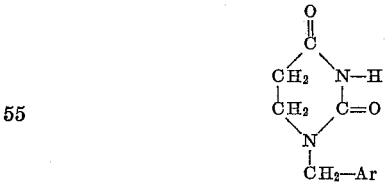

where Ar is a monocarbocyclic aryl radical having six ring-carbon atoms, which comprises reacting an N-(2-carbamylethyl)-N-arylmethyltrichloroacetamide with an alkaline agent.

3. A process for the preparation of an N-carbamyl-N-(2-carboxyalkyl)-aromatic-alkylamine having the structural formula

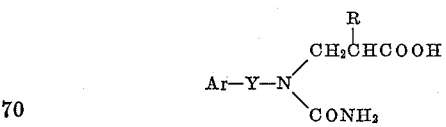

where R is a member selected from the group consisting of H and a lower-alkyl radical, Ar is a member selected from the group consisting of phenyl, naphthyl, biphenylyl, furyl, pyridyl and thienyl radicals and Y is a lower-alkylene radical which can be substituted further by a second aromatic radical Ar, which comprises reacting an N-aromatic-alkyl-N-(2-carbamylalkyl)trichloroacetamide having the structural formula

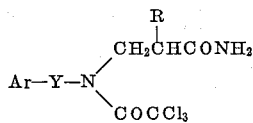

with an excess of an alkaline agent.

4. A process for the preparation of an N-carbamyl-N-(2-carboxyethyl)-arylmethylamine having the structural formula

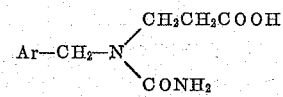

where Ar is a monocarbocyclic aryl radical having six ring-carbon atoms, which comprises reacting an N-arylmethyl-N-(2-carbamylethyl)trichloroacetamide with an excess of an alkaline agent.

References Cited by the Examiner
UNITED STATES PATENTS
3,124,580   3/64   Surrey et al. _____ 260—260

NICHOLAS S. RIZZO, *Primary Examiner*.

UNITED STATES PATENT OFFICE
CERTIFICATE OF CORRECTION

Patent No. 3,194,808

July 13, 1965

Alexander R. Surrey et al.

It is hereby certified that error appears in the above numbered patent requiring correction and that the said Letters Patent should read as corrected below.

Column 1, line 15, for "March 10, 1954" read -- March 10, 1964 --; column 2, line 54, for "hereinafter" read -- hereinabove --; column 3, line 28, for "-N-1" read -- -N- --; line 66, for "reagent" read -- reaction --; column 5, line 68, for "ot" read -- to --; line 71, for "administraiton" read -- administration --; column 6, line 14, for "1-(naphthylmethyl)-1,4-" read -- 1-(1-naphthylmethyl)-2,4- --; line 18, for "-hexylbenzyl-2,4-" read -- -hexylbenzyl)-2,4- --; line 52, for "4-methyl" read -- 5-methyl --; line 53, for "4-chloro" read -- 5-chloro --; column 7, line 36, for "($DP_{50}$)" read -- ($PD_{50}$) --; line 59, for "carbahylethyl" read -- carbamylethyl --; line 67, for "(carbamylbutyl)" read -- (2-carbamylbutyl) --; line 70, for "(carbamylethyl)" read -- (2-carbamylethyl) --; column 8, lines 13 and 14, for "that was" read -- that separated was --; column 9, line 15, for "Cl, 94.36" read -- Cl, 49.36 --; column 10, line 48, for "N-arbamyl-N-" read -- N-carbamyl-N- --; line 52, for "$C_{12}H_{18}N_2O_3$" read -- $C_{12}H_{16}N_2O_3$ --; column 11, line 21, for "N-carbamy" read -- N-carbamyl --; column 12, line 20, for "chlorobenzylamines" read -- chlorobenzylamine --; column 13, line 55, for "$C_{12}N_{27}NO_2$" read -- $C_{12}H_{17}NO_2$ --; column 15, line 8, for "155-6° C." read -- 155.6° C. --; line 22, for "steam for" read -- steam bath for --; same column 15, line 27, for "acid" read -- said --.

Signed and sealed this 10th day of May 1966.

(SEAL)
Attest:

ERNEST W. SWIDER
Attesting Officer

EDWARD J. BRENNER
Commissioner of Patents